(12) United States Patent
Okabe et al.

(10) Patent No.: US 6,994,455 B2
(45) Date of Patent: Feb. 7, 2006

(54) LED ILLUMINATOR

(75) Inventors: Toshiaki Okabe, Shizuoka (JP); Haruyuki Matsushita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/870,184

(22) Filed: Jun. 18, 2004

(65) Prior Publication Data

US 2004/0257830 A1    Dec. 23, 2004

(30) Foreign Application Priority Data

Jun. 20, 2003  (JP)  ............................ 2003-175903

(51) Int. Cl.
    *F21V 29/00*    (2006.01)
(52) U.S. Cl. ...................... 362/362; 362/800; 362/227; 362/545; 362/249
(58) Field of Classification Search ................ 362/226, 362/227, 555, 545, 546, 249, 240, 362, 800; 361/679, 728, 729, 730, 735, 736
    See application file for complete search history.

(56) References Cited

U.S. PATENT DOCUMENTS

| 6,038,130 A | * | 3/2000 | Boeck et al. | ............... | 361/735 |
| 6,483,254 B2 | * | 11/2002 | Vo et al. | .................. | 315/241 S |
| 6,680,200 B2 | * | 1/2004 | Everett | ....................... | 435/420 |
| 6,905,228 B1 | * | 6/2005 | Takeyasu et al. | ........... | 362/249 |
| 2004/0240229 A1 | * | 12/2004 | Blumel et al. | .............. | 362/555 |
| 2005/0068777 A1 | * | 3/2005 | Popovic | ....................... | 362/307 |
| 2005/0105291 A1 | * | 5/2005 | Wu | ............................. | 362/294 |

FOREIGN PATENT DOCUMENTS

JP          9-272377 A        10/1977

* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

Each of a plurality of LED lamp modules includes a base, an LED drive circuitry mounted on the base, and a cover coupled with the base to cover the LED drive circuitry. The LED lamp modules are stacked one on another. A single flat cable is extending through the LED lamp modules so as to have at least one first portion disposed outside the LED lamp modules and a plurality of second portions disposed inside the LED lamp modules to be electrically connected to the LED drive circuitry in each of the LED lamp modules. The first portion of the flat cable is sandwiched between the base of an upper one of the LED lamp modules and the cover of a lower one of the LED lamp modules.

4 Claims, 7 Drawing Sheets ic # LED ILLUMINATOR

BACKGROUND OF THE INVENTION

The present invention relates to a small-sized illuminator provided with an LED (light-emitting diode) which is used as a room light or a map light of a vehicle to illuminate the cabin and the interior of a container for small items such as a console box, a glove compartment, an accessory pocket, or an ash tray. It may also illuminate a cup holder or the area of passengers' feet.

FIG. 6 shows a first example of a related-art illuminator which is disclosed in Japanese Patent Publication No. 9-272377 (cf., pages 2–4, FIG. 1).

In this example, an illuminator 60 is capable of illuminating the interior of containers for small items such as a console box 66 with adequate luminance at low power consumption. The illuminator comprises a main body 61, a circuit board 63 attached to the main body 61, and a lens 65 which covers the circuit board 63.

The main body 61 is formed in a box-shaped general configuration using a synthetic resin material. A mount 62 for mounting the illuminator 60 to a surface of a wall of the console box 66 is provided in a lower part of the main body 61. Each of the circuit board 63 and the lens 65 is securely held on the main body 61 using an engagement member.

A plurality of LED chips 64 are mounted on the circuit board 63. The LED chips 64 are arrayed and connected to an alternator and a battery through branch lines 66 so that the emitted light linearly. The circuit board 63 is also provided with electronic components such as a rectifier diode for preventing noises and a current limiting resistor which are not shown.

The lens 65 is formed in a box-shaped configuration from a highly transparent synthetic resin material. Therefore, light emitted from the LED chips 64 is converged as it passes through the lens 65 to illuminate the interior of the console box 66 with high luminance.

With such a configuration, since a large number of LED chips 64 are mounted, an illuminator can be provided which can illuminate the interior of a container for small items with sufficient luminance and which consumes small power.

In this example, since ends of the two branch lines 66 are connected to the circuit board 53, a new branch line 66 must be formed on the trunk line to provide an additional illuminator. This is troublesome and costly, and a problem arises in that an additional illuminator cannot be easily provided.

Further, since the plurality of LED chips 64 is mounted on the circuit board 63, a problem arises in that the main body 61 is therefore large-sized and cannot be mounted to a container for small items which has only a small space therein. For example, the lamp may not be mounted to an ash tray or cup holder. When the intervals between the plurality of LED chips 64 are decreased to reduce the size of the illuminator 60, a problem arises in that the temperature in the illuminator 60 increases because of poor heat radiation to reduce light-emitting efficiency. In particular, a red LED chip may undergo an abrupt reduction of light-emitting efficiency at a high temperature.

When the illuminator 60 is used in a container for small items such as an ash tray or cup holder, it will sufficiently work with a small number of LED chips 64 because high luminance is not required. When the illuminator 60 is used in a console box or a glove compartment or used as a map light, it must have a large number of LED chips 64 because high luminance is required. While the number of the LED chips 64 depends on the size of the container for small items or the place to be illuminated, the illuminator 60 cannot accommodate an increase or decrease in the number of the LED chips 64 with flexibility. It is therefore required to redesign the main body 61, the circuit board 63, and the lens 65 to satisfy such a requirement, which results in the problem of an increase in total cost including tooling costs.

FIG. 7 shows a second example of an related-art illuminator. In this example, illuminators 70 which are mounted in containers for small items such as a console box and glove compartment in a way similar to that in the first example. The illuminators 70 are connected to a wire harness 75 provided in a vehicle through joint connectors 71, branch lines 72, and module-side connectors 73 in a manner so-called bus-type connection.

When an additional illuminator 70 is to be provided, a new joint connector 71, branch line 72, and module-side connector 73 are prepared and are arranged along the wire harness 75 similarly to the other illuminators 70 in parallel with them.

In this example, although it is advantageous in that connecting operations are simple because the illuminators 70 are connected to ends of the branch lines 72 using connectors, there is a problem in that the illuminators cannot be made small. Further, since the illuminators 70 are connected to the wire harness 75 through the joint connectors 71, the branch lines 72, and the module-side connectors 73, there is a problem in that a large number of components are involved to result in a high total cost. Further, since the illuminators 70 are connected to ends of the branch lines, not intermediate portions of the same in a manner similar to that in the first example, there is a problem in that it is uneasy and troublesome to provide an additional illuminator 70.

FIG. 8 shows a third example of an related-art illuminator. The present example is different from the second example in that a plurality of illuminators 80 is serially connected to a branch line 81 which branches from a wire harness.

Each of the illuminators 80 is constituted by a case 87 formed by a base 84 and a cover 86 and a connecting circuit. Both of the base 84 and the cover 86 are provided by molding a synthetic resin material having insulating properties. An intermediate section of the branch line 81 is soldered to the connecting circuit.

In this example, a redundant part 81a of the cable 81 is left between the adjoining illuminators 80 to facilitate the assembly of each of the illuminators 80. However, if the redundant part 81a is too long, the cable can be flapped by vibration of the vehicle when it is running, which results in the problem of the generation of noises and damage of the cable due to interference with its surroundings.

SUMMARY OF THE INVENTION

It is therefore an object of the invention to provide an illuminator provided with LED chips (hereinafter, simply referred as an LED illuminator) capable of solving the above problems, particularly to prevent a redundant part of an cable from flapping to thereby eliminating the generation of noises and the damaged due to interference with its surroundings.

In order to achieve the above object, according to the invention, there is provided an LED illuminator, comprising:

a plurality of LED lamp modules, each of which comprises:

a base;

an LED drive circuitry, mounted on the base; and a cover, coupled with the base to cover the LED drive circuitry, the LED lamp modules being stacked one on another; and a flat cable, extending through the LED lamp modules so as to have at least one first portion disposed outside the LED lamp modules and a plurality of second portions disposed inside the LED lamp modules to be electrically connected to the LED drive circuitry in each of the LED lamp modules, wherein the first portion of the flat cable is sandwiched between the base of an upper one of the LED lamp modules and the cover of a lower one of the LED lamp modules.

With such a configuration, since the plurality of the LED lamp modules connected to the flat cable are stacked one on another, the luminance of the LED lamps can be adequately adjusted depending on the specifications of areas to be illuminated. Since the redundant part (the first portion) of the flat cable is sandwiched between the base of the upper module and the cover of the lower modules, the generation of noises and damage due to flapping of the redundant part of the flat cable can be prevented.

Preferably, an outer face of the base is formed with a groove for receiving the first portion of the flat cable.

With such a configuration, the redundant part of the cable is securely positioned by being contained in the groove, which prevents a transverse shift of the redundant part. Therefore, the first portion is completely protected from interference with its surroundings.

Preferably, the cover comprises a retainer which retains each of the second portions of the flat cable on an inner face of the base.

With such a configuration, the flat cable can be prevented from being lifted from the inner face of the base even when the first portion of the flat cable is folded back to be sandwiched by the LED lamp modules.

Preferably, each of the LED lamp modules comprises a guide member disposed on an inner face of the base to restrict a lateral movement of each of the second portions of the flat cable.

With such a configuration, the flat cable extended along the inner and outer faces of the base can be prevented from being damaged due to the friction caused by the lateral movement.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

Preferred embodiments of the invention will be described below in detail with reference to the accompanying drawings.

An LED illuminator 10 is a small-sized illuminator which is provided by stacking LED lamp modules 34 serially connected to a two-core flat cable 40 and which is used as a room light or a map light of a vehicle for illuminating the cabin and the interior of a container for small items such as a console box, a glove compartment, or an accessory pocket.

Figure 8:
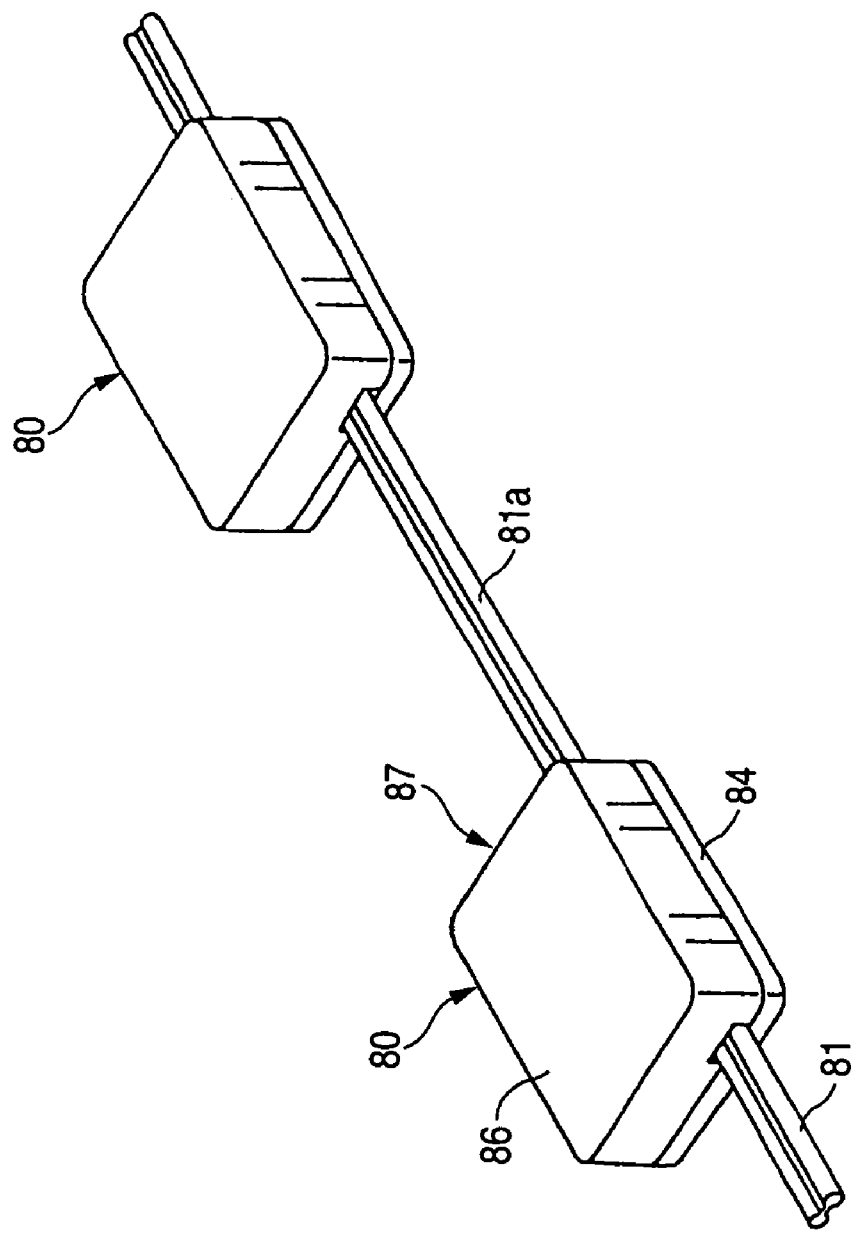
FIG. 8 is a sectional view showing still another example of an illuminator according to the related-art (a third example of the related-art).

The plurality of LED lamp modules 34 is disposed at predetermined intervals before they are stacked one on another such that a redundant part 41 of the flat cable 40 is left as seen in the related-art example shown in FIG. 8. The flat cable 40 is a single cable which extends through the plurality of LED lamp modules 34. The number of the LED lamp modules 34 connected to the flat cable 40 may be more than two.

The LED illuminator 10 is operated by power supplied from a battery through the flat cable 40. A junction box and a joint connector which are not shown are connected to an upstream side of the flat cable 40. For example, the junction box is connected to a battery through a wire harness which is not shown, and the joint connector is connected to the junction box through the wire harness. The LED lamp modules 34 are connected to the joint connector through the single flat cable 40. When the junction box has the function of branching the wire harness which is a trunk line, the flat cable 40 can be branched from the junction box without providing the joint connector.

The junction box is a well-known electric connection box made of a synthetic resin containing a circuit board and a wiring board and also having electrical components such as connectors, relays, and fuses connected to the wiring board. For example, the junction box is provided in the engine room of a vehicle or in the neighborhood of an instrument panel thereof. The joint connector is provided downstream of the junction box, e.g., at a front pillar or in the neighborhood of the same.

Each of the LED lamp modules 34 is comprised of a base 12, a bus bar circuit 35 provided with an LED chip 38, and a cover 25. A box-shaped case is formed by the base 12 and the cover 25.

Figure 2:
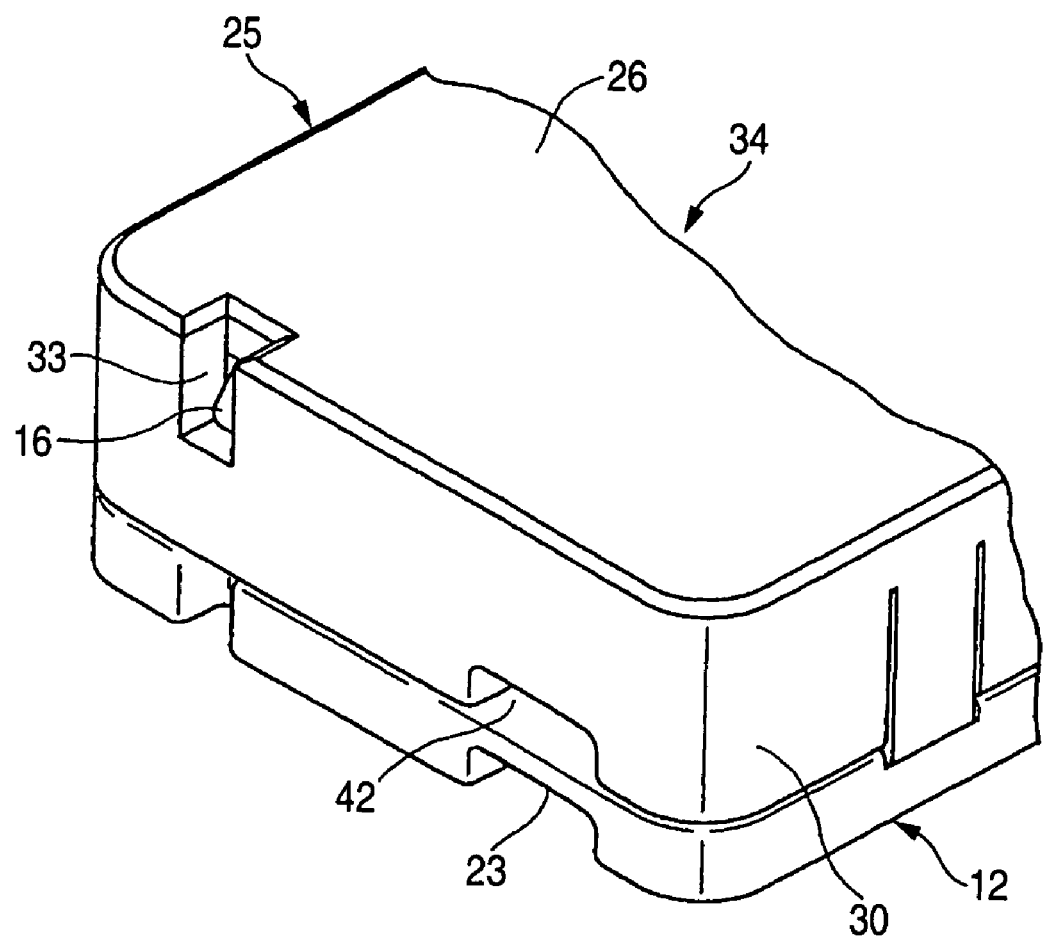
FIG. 2 is an enlarged perspective view of an groove of the LED illuminator shown in FIG. 1.
Figure 5:
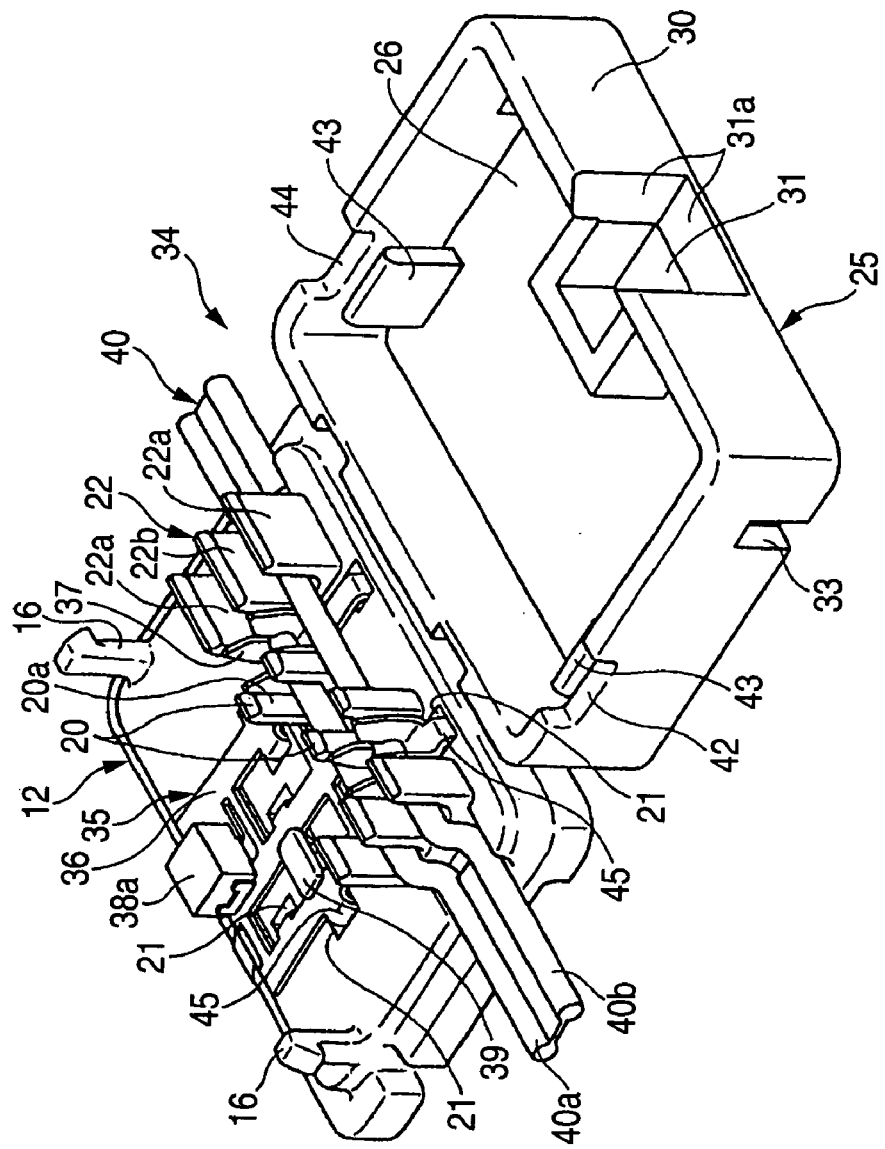
FIG. 5 is an exploded perspective view of one of LED lamp modules which constitute the LED illuminator.
Figure 6:
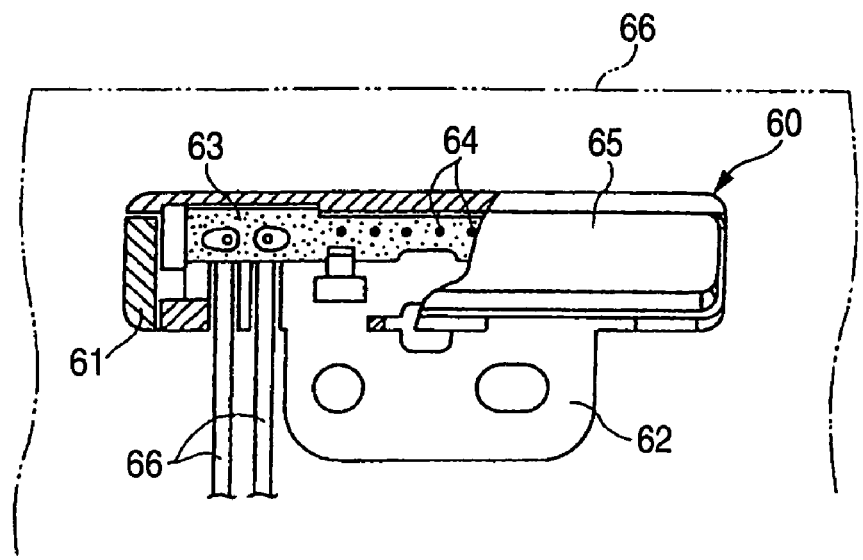
FIG. 6 is a sectional view showing an example of an illuminator according to the related-art (a first example of the related-art)
Figure 7:
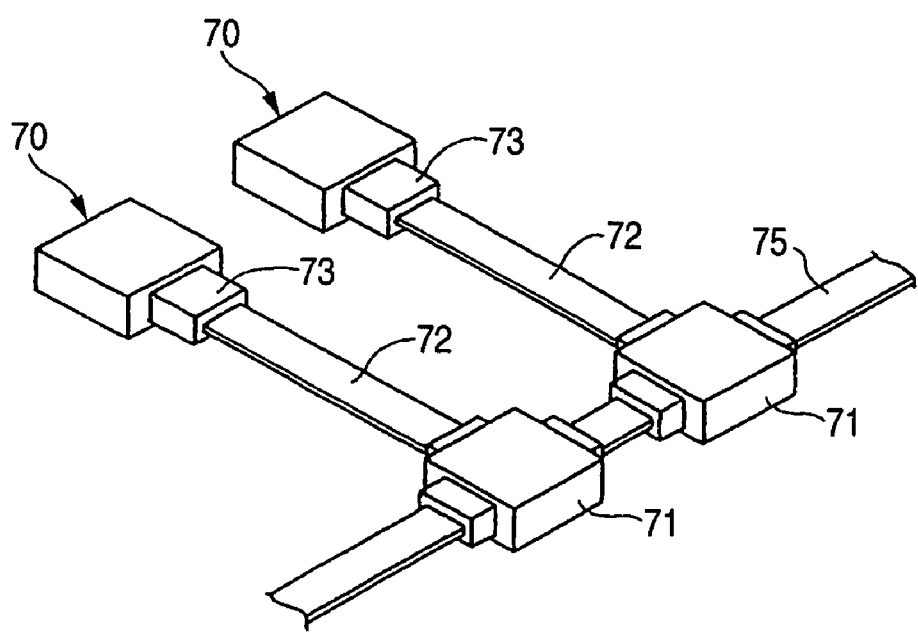
FIG. 7 is a sectional view showing another example of an illuminator according to the related-art (a second example of the related-art)

The rectangular plate-shaped base 12 is formed by molding a synthetic resin material having insulating properties. As shown in FIGS. 2 and 5, the base 12 is formed with an groove 23, engagement claws 16, reinforcement ribs 20, and guide members 22 which are described later in detail. The material of the base 12 is not limited to a synthetic resin, and it may be formed of any other material such as hard silicone rubber or ceramics as long as it has high insulating properties and moldability.

The flat cable 40 is constituted by one positive-side cable (power supply line) with insulation coating and one negative-side cable (ground line) with insulation coating which are connected in parallel with each other by a flat insulation band provided therebetween, but two cables are separatable at a desired portion (see FIG. 5). The flat cable 40 extends through the LED lamp modules 34 without any discontinuation while a part of the flat cable 40 is electrically connected to each bus bar circuit 35.

The bus bar circuit 35 has a thin plate-shaped bus bar 36 which is formed by punching a conductive substrate according to a circuit pattern. An LED chip 38 and a constant-current diode 39 are soldered to the bus bar 36.

As shown in FIG. 5, the conductive bus bar 36 is formed with pairs of terminals 37 and engagement pieces 45. The terminals 37 extend upright from an end of the bus bar 36 so that each electric wire of the flat cable 40 is press-fitted into each pair of the terminals 37 to establish the electric contact between the power supply and the flat cable 40. Since the terminals 37 are connected to the constant-current diode 39 and the LED chip 38 through the bus bar 36, the power supply current is supplied to the LED chip 38 through the constant-current diode 39.

The engagement pieces 45 are provided in some locations of the bus bar 36 as needed. Those engagement pieces 45 are inserted into recesses 21 formed on the base 12 to secure the bus bar 36 on the base 12 in a single action.

The W-shaped guide members 22 are members for keeping the flat cable 40 wired on the inner face 13a of the base 12 straight while restricting the lateral movement thereof. Specifically, the positive-side cable 40a is held between one of the outer walls 22a and a center wall 22b, while the negative-side cable 40b is held between the other one of the outer walls 22a and the center wall 22b. An interval between each outer wall 22a and the center wall 22b is made smaller than an outer diameter of each of the cables 40a, 40b to securely hold the cables 40a, 40b on the guide member 22.

Figure 3:
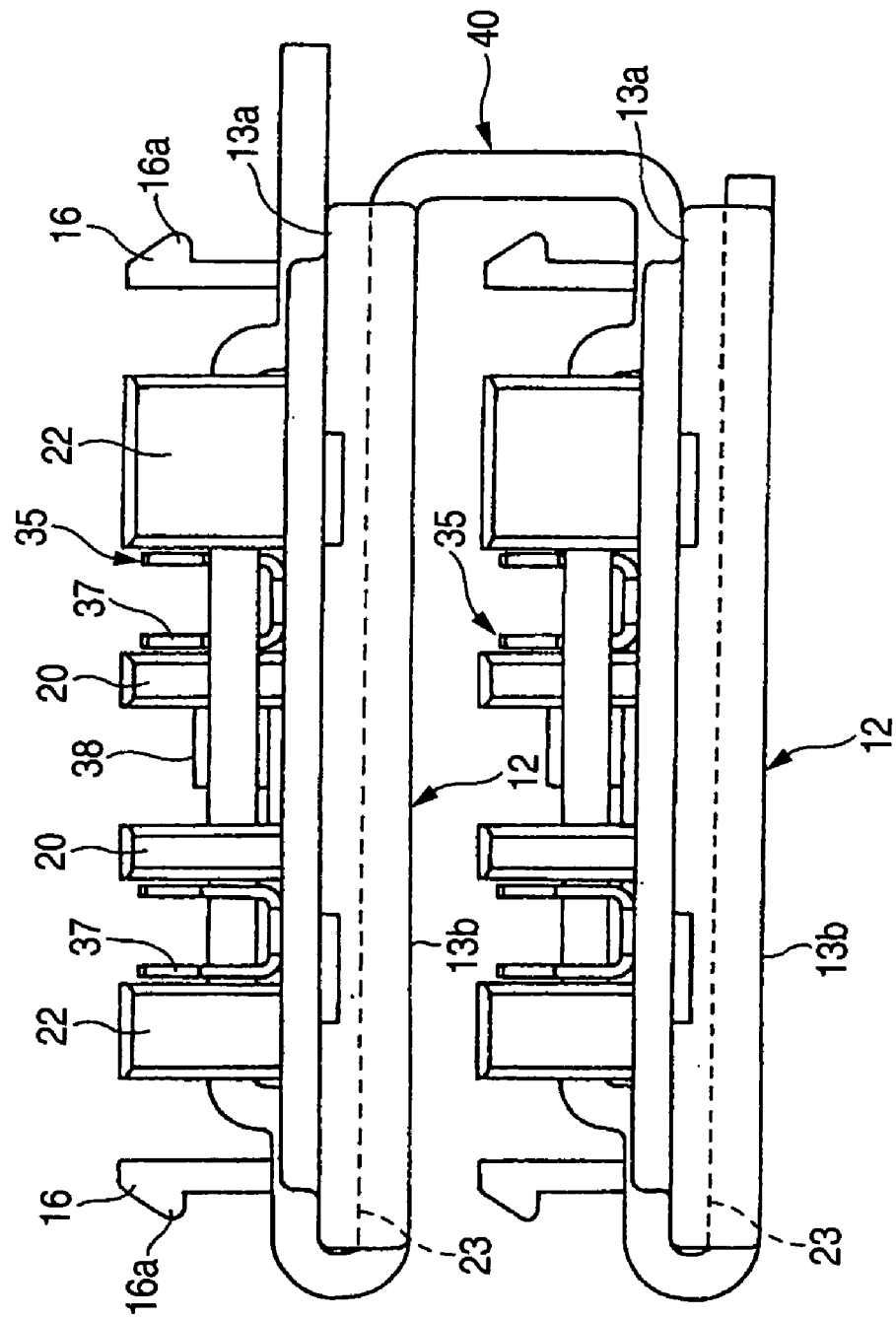
FIG. 3 is a side view of the LED illuminator in a state in which a cover of the same is removed.

The reinforcement ribs 20 extend upright from the inner face 13a of the base and disposed between the guide members 22 for reinforcing the terminals 37. Each pair of the reinforcement ribs 20 is associated with one pair of the terminals 37. Each pair of the terminals 37 is disposed between one pair of the reinforcement ribs 20 and one guide member 22 as shown in FIGS. 3 and 5. With this configuration, the terminals 37 are prevented from being inclined by the reinforcement ribs 20 and the guide members 22 when the press-fitting of the cables 40a, 40b is performed.

The LED chip 38 is a white light-emitting diode of surface-mount type having two terminals, i.e., positive and negative terminals on the bottom surface thereof. The LED chip 38 used in the present embodiment has a rated current of 20 mA and a rated voltage of 3.5V. The battery voltage is decreased by the constant-current diode 39 and adjusted to the rated voltage of 3.5V. While the constant-current diode 39 is advantageous in a case where a voltage fluctuates as can be observed in a vehicle, a current-limiting resistor may alternatively be used when there is no voltage fluctuation. The color of the LED chip 38 is not limited to white, and it may be red, blue or green.

The LED chip 38 is characterized in that it consumes small power and has a long life, high directivity, and high luminance. It consumes small power and has a long life because it converts electricity into light with very high efficiency (90%). It has high directivity and high luminance because it emits no diffuse light unlike an incandescent lamp. The invention is not limited to an LED chip 38 as described above, and LED chips having various outputs may be used. Further, the invention is not limited to a surface mount type LED chip 38, and a bullet-shaped LED chip may be used.

As shown in FIG. 5, the box-shaped cover 25 is formed by molding a resin so as to comprise a ceiling wall 26 and circumferential walls 30 which is orthogonal to and contiguous with the edges of the ceiling wall 26. A space is defined by the ceiling wall 26 and circumferential walls 30 so as to be adapted to cover and protect the bus bar circuit 35. The circumferential walls 30 are formed with retaining grooves 33, an window 31, an inlet 42 and an outlet 44 for the flat cable 40. The ceiling wall 26 is formed with retainers 43.

The engagement claws 16 extend upright from the inner surface 13a of the base 12 in positions associated with the retaining grooves 33 formed on the cover 25. As shown in FIG. 3, a claw member 16a is formed on a distal end of each engagement claw 16 so that the engagement claws 16 and the retaining grooves 33 are engaged to combine the base 12 and the cover 25 such that they will not accidentally come apart as shown in FIG. 2.

The rectangular window 31 releases the light emitted from the LED chip 38 to the outside. The edges of the window 31 are chamfered into slope faces 31a so that the released light is allowed to be diffused at a predetermined angle (120 degrees in this embodiment). A reflective material may be applied to a ceiling surface 31 of the light projecting window 31, the surface of the ceiling wall 26 facing a top face of the LED chip 38 that constitutes a light-emitting surface 38a thereof. Thus, light emitted from the light-emitting surface 38a is reflected by the reflective material and emitted out of the window 31 with high efficiency.

As shown in FIG. 2, the outlet 42 and the inlet 44 are recesses communicating the inside and the outside of the circumferential walls 30, so that the flat cable is allowed to pass therethrough to be led into or out of the module 34.

Figure 1:
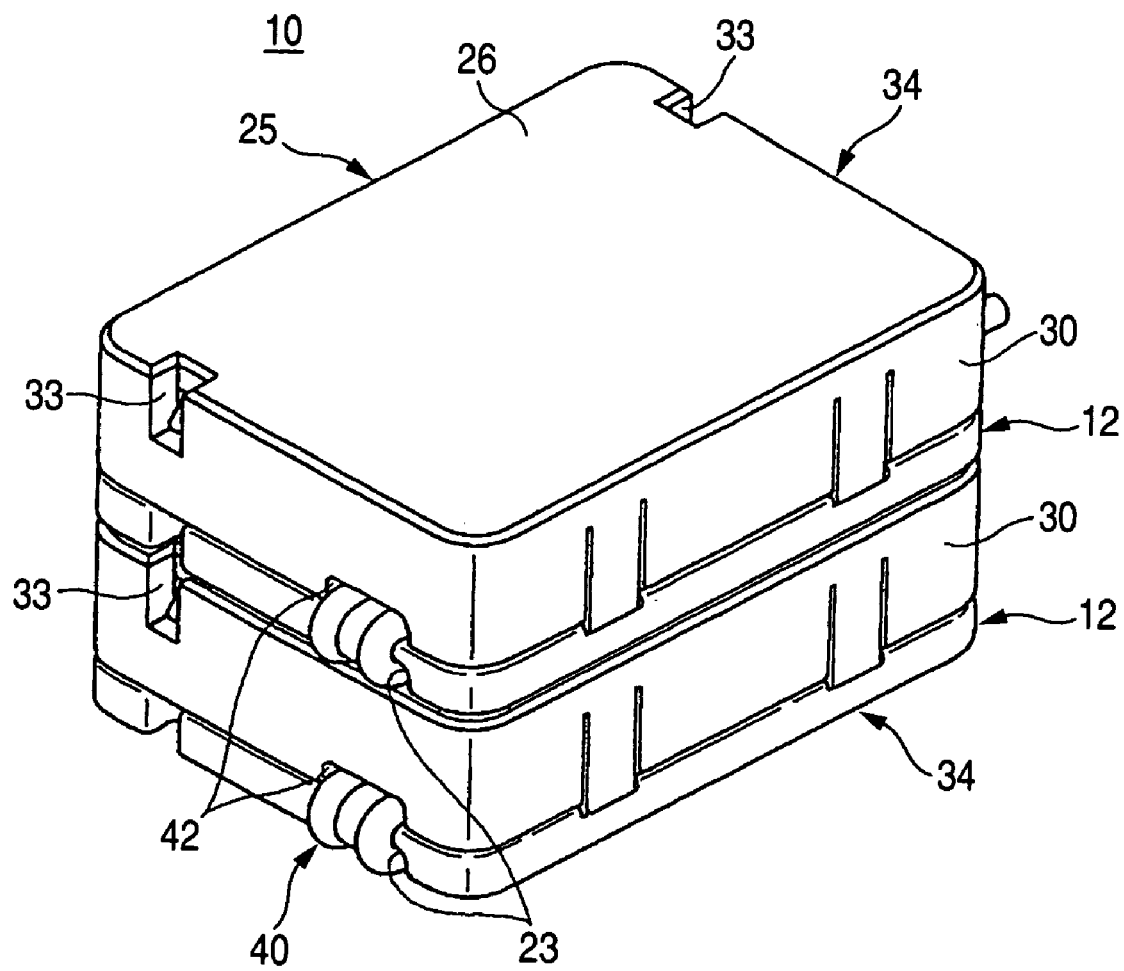
FIG. 1 is a perspective view showing an embodiment of an LED illuminator according to the invention.
Figure 4:
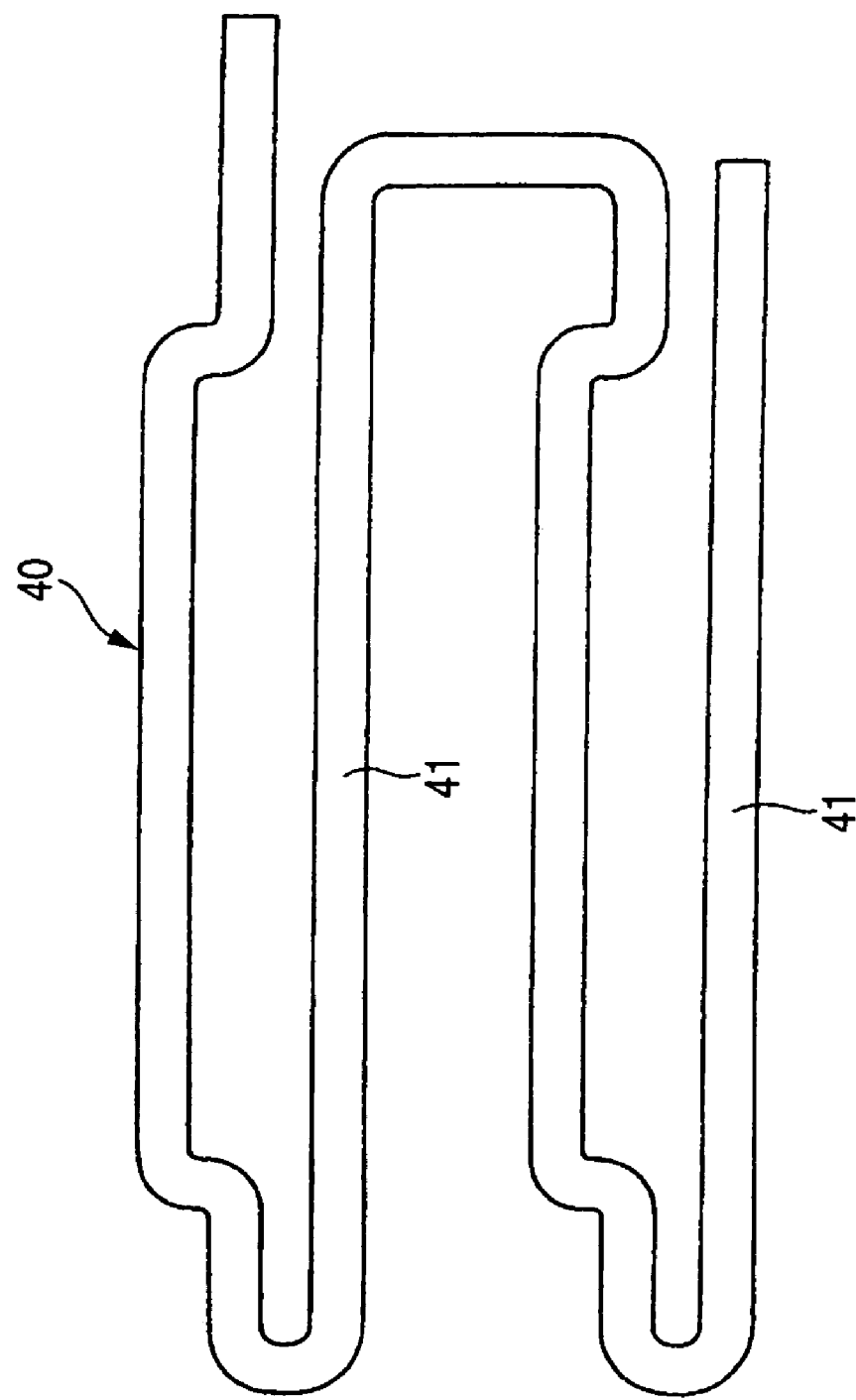
FIG. 4 is a wiring diagram of a flat cable which is connected to the LED illuminator.

In this embodiment, as shown in FIG. 1, two LED lamp modules 34 connected to the flat cable 40 are stacked one on another to constitute the LED illuminator 10. Incidentally, as shown in FIGS. 1 and 4, the flat cable 40 extends while being sandwiched by the base 12 of the upper module and the cover 25 of the lower module. More specifically, the flat cable 40 wired along an inner face 13a of the base 12 of the upper module 34 is led out from an outlet 42 (see FIGS. 1 and 2) and folded back such that the redundant part 41 extends along an outer face 13b of the base 12. The flat cable 40 is again folded back to be led into the lower module 34 through an inlet 44. That is, as shown in FIG. 4, the flat cable 40 is wired like a crank.

With such a configuration, since the redundant part 41 located between the adjoining LED lamp modules 34 is sandwiched between the base 12 and the cover 25 of the LED lamp modules 34 stacked one on another, the redundant part 41 will not be exposed to the outside, which prevents the generation of noises and damage due to the flapping of the redundant part.

As shown in FIGS. 1 through 3, the groove 23 is formed on the outer surface 13b of the base 12 so as to contain the redundant part 41 of the flat cable 40. The groove 23 is formed with a depth equal to or greater than the thickness of the flat cable 40 so that the redundant cable can be completely contained. The groove 23 is formed with a width similar to the width of the flat cable 40 so as to restrict the lateral movement of the redundant part 41.

Thus, the redundant part 41 of the flat cable 40 will not be exposed on the outside of the LED lamp module 34, which completely prevents damage on the cable due to interference with the surroundings.

The retainers 43 extend from the ceiling wall 26 so as to oppose to the outlet 42 and the inlet 44, respectively. When the base 12 and the cover 25 are combined, the tip ends of the retainers 43 press the flat cable 40 to prevent the flat cable 40 from moving in the longitudinal direction thereof. Further, the retainers 43 prevent the flat cable 40 from being lifted from the inner face 13a of the base 12 even when the flat cable 40 led out from the outlet 42 is folded back to be accommodated in the groove 23 as described the above.

As thus described, according to the present embodiment, the bus bar circuit 35 mounted on the base 12 is covered by the cover 25 to protect electrical components such as the LED chip 38 and the constant-current diode 39 and to thereby maintain reliability of electrical connections. Since the plurality of LED lamp modules 34 connected to the flat cable 40 are stacked one on another, the luminance of the LED lamps can be adjusted according to the specifications of an area to be illuminated. Since the redundant part 41 of the flat cable 40 is left between the adjoining LED lamp modules 34, the assembling workability of the LED lamp modules 34 is improved. Since the redundant part 41 of the flat cable 40 is sandwiched between the base 12 of the upper module 34 and the cover 25 of the lower module 34, the generation of noises and damage due to flapping of the cable can be avoided.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An LED illuminator, comprising:
   a plurality of LED lamp modules, each of which comprises:
   a base;
   an LED drive circuitry, mounted on the base; and
   a cover, coupled with the base to cover the LED drive circuitry, the LED lamp modules being stacked one on another; and
   a flat cable, extending through the LED lamp modules so as to have at least one first portion disposed outside the LED lamp modules and a plurality of second portions disposed inside the LED lamp modules to be electrically connected to the LED drive circuitry in each of the LED lamp modules,
   wherein the first portion of the flat cable is sandwiched between the base of an upper one of the LED lamp modules and the cover of a lower one of the LED lamp modules.

2. The LED illuminator as set forth in claim 1, wherein an outer face of the base is formed with a groove for receiving the first portion of the flat cable.

3. The LED illuminator as set forth in claim 1, wherein the cover comprises a retainer which retains each of the second portions of the flat cable on an inner face of the base.

4. The LED illuminator as set forth in claim 1, wherein each of the LED lamp modules comprises a guide member disposed on an inner face of the base to restrict a lateral movement of each of the second portions of the flat cable.

* * * * *